US005136783A

United States Patent [19]

Bell et al.

[11] Patent Number: 5,136,783

[45] Date of Patent: Aug. 11, 1992

[54] CHAIN SAW SPROCKET

[75] Inventors: Don A. Bell, Portland; Encho Kuzarov, Milwaukie, both of Oreg.

[73] Assignee: Blount, Inc., Portland, Oreg.

[21] Appl. No.: 704,466

[22] Filed: May 23, 1991

[51] Int. Cl.[5] .............................................. B23D 57/02

[52] U.S. Cl. .......................................... 30/384; 125/21

[58] Field of Search ................................ 30/384, 385; 83/830–833; 125/21

[56] References Cited

U.S. PATENT DOCUMENTS 4,593,591 6/1986 Beerens ............................ 30/384 X 4,981,129 1/1991 Osterman et al. ................ 30/384 X

*Primary Examiner*—Douglas D. Watts

*Attorney, Agent, or Firm*—Robert L. Harrington

[57] ABSTRACT

A chain saw bar nose has a rotatable sprocket. The sprocket assembly is adapted to conform in shape to the drive tang portions of the saw chain whereby the nose sprocket may receive operational forces imposed by the saw chain substantially as compressive forces as opposed to tensile forces. As a result, the nose sprocket assembly better withstands the harsh operating conditions imposed by cutting applications.

9 Claims, 2 Drawing Sheets

CHAIN SAW SPROCKET

BACKGROUND OF THE INVENTION

The present invention relates generally to power equipment, and particularly to chain saws used for cutting material.

A chain saw includes a powerhead and a guide bar about which a saw chain is entrained. A portion of the chain rests slidably within a groove about the periphery of the guide bar. The saw chain includes cutting links extending outward from the guide bar and drive tangs extending into the groove and positioned for engagement by a drive sprocket of the powerhead to move the saw chain about the guide bar during cutting operations. As the saw chain engages a work piece, operational forces develop tension within the saw chain as the drive sprocket urges the chain into movement and the work piece resists such movement. These operational forces can be particularly acute at the guide bar nose, i.e. the distal end of the guide bar, and represent a potential for damage to the guide bar.

To more broadly distribute operational forces imposed upon the guide bar, saw chains include nose sprockets. The nose sprocket mounts rotationally at the guide bar nose and includes teeth adapted to engage the tang portions of the saw chain. The nose sprocket may be implemented as an outer bearing race coupled by a roller bearing set to an inner bearing race affixed to the guide bar. As the saw chain moves about the guide bar, the nose sprocket rotates and lifts the chain away from the guide bar at the guide bar nose. Operational forces developed at the guide bar nose bear against the nose sprocket rather than directly upon the guide bar rails. The nose sprocket thereby delivers these forces, in distributed fashion, to the guide bar through the bearing arrangement.

Saw chain technology has taught that the nose sprocket gullets, i.e. space between sprocket teeth for receiving the chain drive tang, should be oversized at their base relative to the drive tangs of the saw chain. Saw chains have included asymmetric formations at the tips of the drive tangs for clearing the guide bar groove and maintaining lubricant movement. An oversized region at the base of the gullet accommodates the asymmetric configuration of these drive tang tips. The drive tang engages the nose sprocket in wedge-like fashion, i.e. the tang contacts the sprocket at two points along the upper portion of the gullet, i.e., at the sides of the adjacent sprocket teeth.

More recently, saw chain technology has been applied to aggregate cutting, but aggregate cutting places greater wear and stress on the saw chain relative to that of wood cutting applications. Much of saw chain technology applicable to wood cutting applications cannot be directly applied to aggregate cutting. For example, the development of aggregate cutting chain saws first overcame the extraordinary wear conditions imposed upon the saw chain as it engaged the abrasive aggregate workpiece. As more durable aggregate cutting saw chains became available, other components of the chain saw demonstrated failure under the harsh, extreme stress conditions of aggregate cutting. Among such components is the nose sprocket.

The present invention provides a guide bar nose sprocket particularly suitable for the extreme stress conditions of aggregate cutting applications.

SUMMARY OF THE INVENTION

A guide bar nose sprocket according to a principle embodiment of the present invention includes gullet formations corresponding in shape to that of the drive tangs of the saw chain. Operational forces imposed upon the sprocket by the tangs of the saw chain are well distributed across a substantial portion of the gullet formation. Wider distribution of operational forces, especially down within the gullet formation as opposed to along the teeth of the sprocket as is traditional in chain saw design, reduces the extraordinary stress imposed on the nose sprocket in, for example, aggregate cutting applications.

According to a preferred embodiment of the invention, the drive tang is closely received within semi-circular nose sprocket gullet formations whereby operational forces imposed upon the nose sprocket arrive substantially as compressive forces, as opposed to the substantially tensile forces found in conventional chain saw design. As a result, the nose sprocket is less likely to fatigue and fail as compressive forces are less stressful than tensile forces.

DETAILED DESCRIPTION

Figure 1:
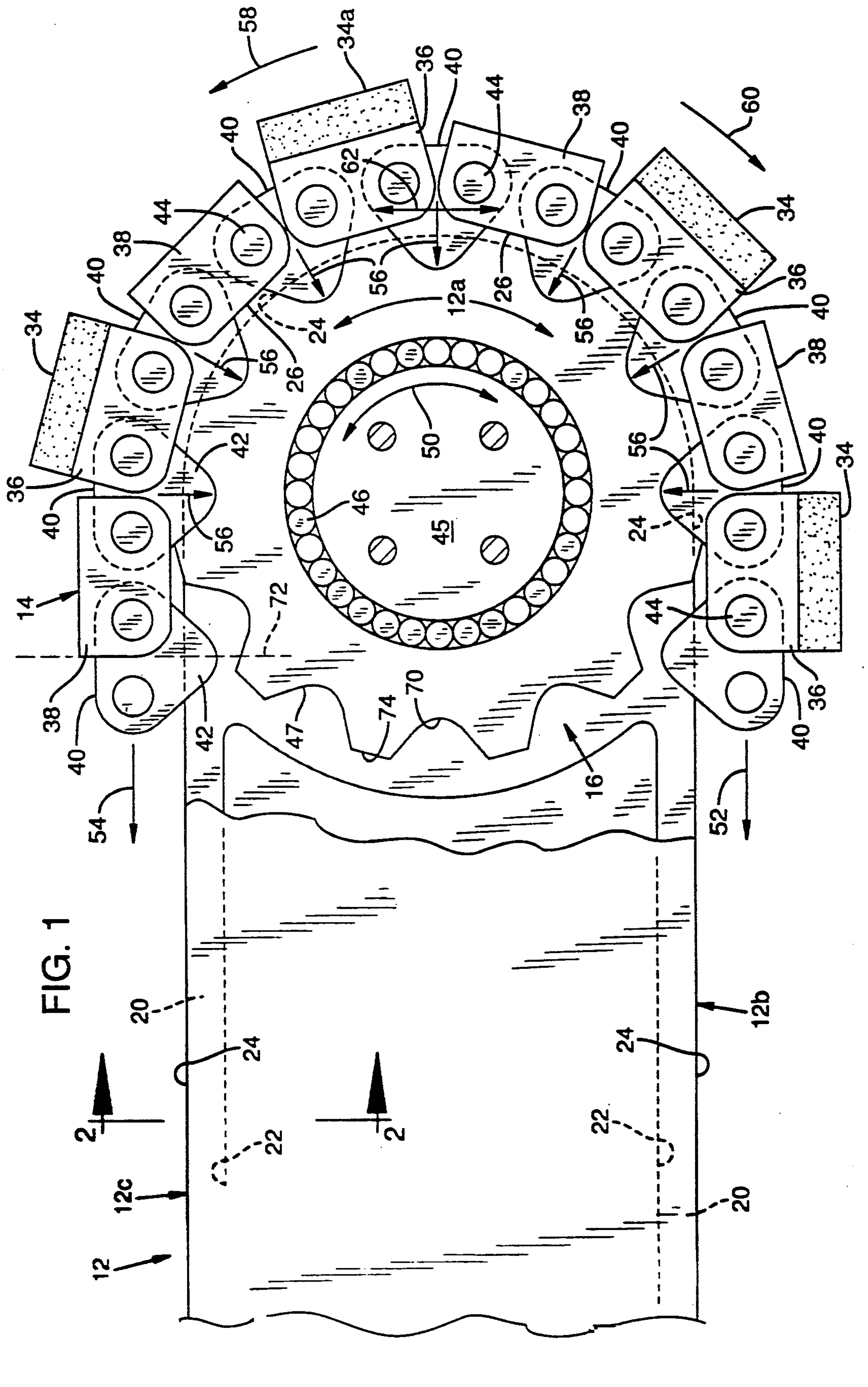
FIG. 1 is a side view of a distal portion of a guide bar including a combination of a nose sprocket and a section of aggregate cutting saw chain according to a principle embodiment of the present invention.

FIG. 1 shows the distal portion of a guide bar for an aggregate cutting chain saw. In FIG. 1, a guide bar 12 carries an aggregate cutting saw chain 14, of which only a portion is shown in FIG. 1. The chain saw also includes a powerhead and drive sprocket (not shown) for engaging and moving chain 14 about the periphery of bar 12. A nose sprocket assembly 16 mounts rotationally at the distal end of bar 12 and engages chain 14.

As chain 14 engages a workpiece, reaction forces of the workpiece upon chain 14 develop tension within chain 14. Along the length of the substantially straight upper and lower edges of bar 12, tension in chain 14 does not bear significantly upon bar 12. At the distal end or nose **12*a* of bar 12, however, such tension in chain 14 produces significant radially inward and tangential forces. Without a sprocket assembly 16 to carry chain 14 about nose 12*a*, such operational forces would bear directly upon the bar 12. The function of nose sprocket assembly 16 is, therefore, to keep chain 14 away from nose 12*a* and receive the operational forces from chain 14 for better distribution to the guide bar 12**.

Figure 2:
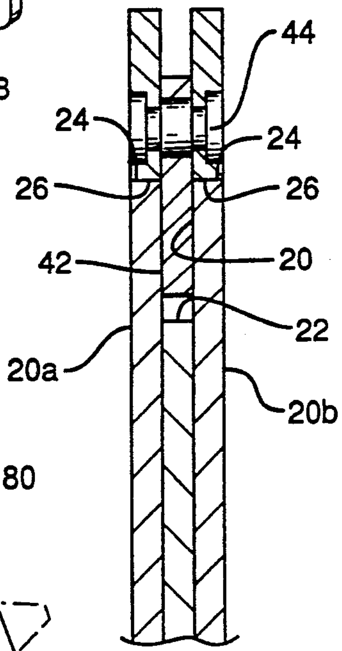
FIG. 2 is a sectional view of the guide bar of FIG. 1 illustrating a peripheral groove formation of bar and positioning of the chain upon the bar.

Referring to FIGS. 1 and 2, saw chain guide bar 12 includes a peripheral groove 20 adapted for receiving the tang portions 42 (described below) of saw chain 14. Groove 20 is defined by left and right rails **20*a* and 20*b* (FIG. 2) and floor surface 22. The outward facing or top surfaces 24 of rails 20 receive the inward or bottom surfaces 26 of side links of chain 14. Surfaces 24 of bar 12 and surfaces 26 of chain 14 act as bearing surfaces allowing chain 14 to freely move about the periphery of bar 12. Nose sprocket assembly 16 separates surfaces 24 and 26 in the region of nose 12***a* for receiving directly at sprocket assembly 16 the operational forces imposed by chain 14, rather than at the relatively weaker rails 20 of nose 12*a*.

Saw chains typically include side link pairs pivotally coupled to center links by rivets. Individual side links can be connecting links or cutter links carrying upward extending saw teeth. In the case of aggregate cutting saw chains, a pair of side links may carry a diamond matrix material suitable for aggregate cutting applications. A side link pair, therefore, can be two connecting links, one connecting link and a cutter link, or a pair of links carrying a diamond matrix. Center links are partially captured between and pivotally coupled to each of the adjacent side link pairs and carry downward extending drive tang portions for engagement by a drive sprocket.

Figure 3:
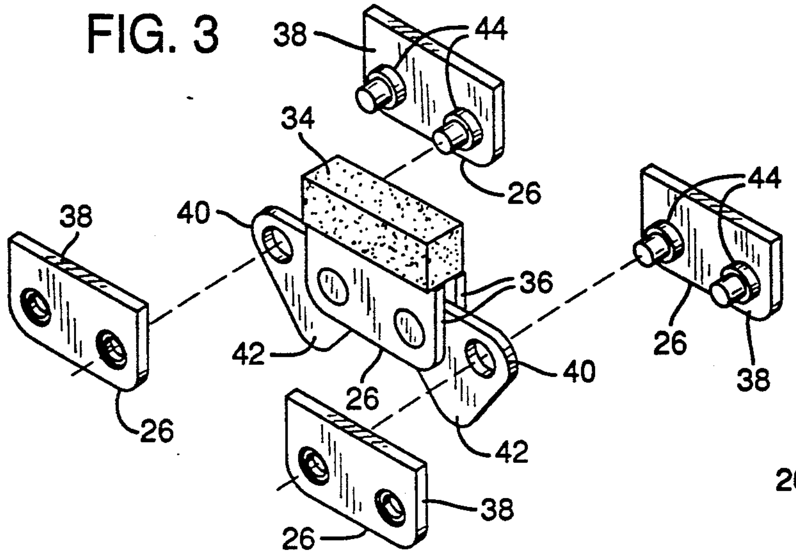
FIG. 3 is an exploded perspective view further illustrating the saw chain of FIG. 1.

Referring now to FIGS. 1 and 3, diamond matrix cutting elements 34 attach to cutter side link pairs 36. Connecting side link pairs 38 are interposed between cutter link pairs 36. Center links 40 have downward extending tang portions 42 adapted for engagement by the powerhead drive sprocket (not shown). Center links 40 are interposed between each of side link pairs 36 and 38, the center links 40 being partially captured at each end between the adjacent side link pairs 36 and 38. Rivets 44 pivotally attach each center link 40 and the adjacent side link pair.

Returning to FIG. 1, chain 14 moves in a clockwise direction 60 at the nose 12*a* of bar 12. More particularly, the powerhead and drive sprocket (not shown) pull chain 14 in the direction indicated by force vector 52. For down-cuts, when the workpiece is engaged along the lower length portion 12*b* of bar 12, the tension in chain 14 is substantially limited to the portion of chain 14 between the point of engagement of the workpiece and the drive sprocket. Thus, during a down-cut operation, sprocket assembly 16 acts substantially as an idler gear carrying little or no operational forces as the portion of chain 14 engaging sprocket assembly 16 carries relatively little tension compared to other cutting operations.

For up-cuts, however, where the saw chain engages the workpiece along the upper length portion 12*c* of bar 12, tension also develops in the portion of chain 14 intermediate the point of engagement and the drive sprocket. That portion, however, includes the section of chain 14 encircling the nose 12*a* of bar 12. This portion of chain 14 encircling nose 12*a* experiences the force vector 52, resulting from the pull of the drive sprocket, and also experiences a force vector 54 resulting from the engagement of the workpiece resisting movement of the chain 14. Thus, the resulting tension in the portion of chain 14 engaging sprocket assembly 16 results in radially inwardly directed force vectors 56 imposed upon the sprocket assembly 16.

For plunge cuts, where the nose 12*a* of bar 12 engages the workpiece, i.e., by longitudinal thrusting of bar 12 into the workpiece, additional tangential forces, i.e., in addition to radially inward force vectors 56, are applied to sprocket assembly 16. More particularly, if, for example, the cutting element 34*a* is the principal cutting element engaging the workpiece, a force vector 58 substantially tangential to the radius of nose piece 12*a* results from the resistive force of the workpiece. The force vector 58 is then opposed by a force vector 60 resulting from the pull of the drive sprocket. Force vector 60 may also be considered substantially tangential to the nose sprocket assembly 16 in the region of nose 12*a*. As a result chain 14 delivers substantially tangential operational force vectors 62 upon the nose sprocket assembly 16 in addition to the radially inward operational force vectors 56. The direction of operational force vectors 62 depends on the relative magnitude of the force vectors 58 and 60, but in any case are substantially tangential to the nose sprocket assembly 16. It may be appreciated that, when other cutting elements 34 engage the workpiece in a plunge cut, various tangential forces such as operational force vectors 62 will result about the nose sprocket assembly 16.

Nose sprocket assembly 16 comprises a center or inner bearing race 45 fixedly attached to guide bar 12. A roller bearing set 46 encircles the inner race 45. The outer race or sprocket 47 of nose sprocket assembly 16 is adapted for engagement of the tang portion 42 of center link 40. The position of nose sprocket assembly 16 on bar 12 and its overall dimension are such to separate the bearing surfaces 26 of chain 14 from the bearing surfaces 24 of bar 12 as chain 14 moves about the nose 12*a* of bar 12. In this manner, sprocket assembly 16 receives operational forces from chain 14.

Gullet formations 70 of sprocket 47 closely receive the tang portions 42 of center links 40. More particularly, the tang portions 42 of center links 40 are substantially symmetric with respect to an axis 72 bisecting the center links 40 and the distance between rivets 44. In the illustrated embodiment, the symmetry results from a similar radius of curvature for gullets 70 and tang portions 42 yielding a semicircular shape for each. Gullet formations 70 thereby possess the same symmetric relationship to the axis 72 when the corresponding tang formation 42 rests within the gullet formation 70. Accordingly, it may be appreciated that the radially inward directed force vectors 56 are well distributed within the gullets 70 as compressive force vectors upon the sprocket 47. Because the tang portions 42 are so closely received within the gullet formation 70, the tangential force vectors 62 are similarly received as substantially compressive force vectors at the sprocket 47. It may be further appreciated that compressive forces imposed upon the sprocket 47 are less stressful to the structure of sprocket 47 as compared to tensile forces.

Figure 4:
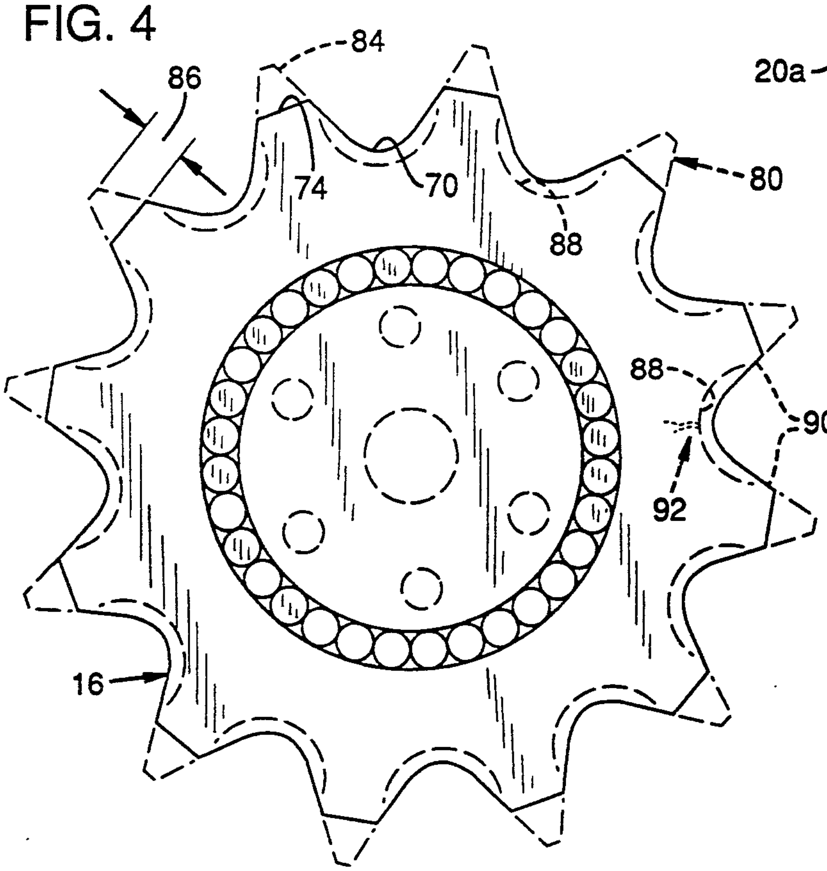
FIG. 4 illustrates in solid line the outer race of the nose sprocket of FIG. 1 in comparison with a conventional outer race nose sprocket, shown in dotted line.

FIG. 4 illustrates in comparison the nose sprocket assembly 16 and a conventional nose sprocket 80. In FIG. 4, conventional nose sprocket 80 is shown in phantom for comparison to the nose sprocket assembly 16. The height of teeth portion 74 of nose sprocket assembly 16 are reduced relative to the height of the teeth portion 84 of sprocket 80. More particularly, such reduction in height is represented by the distance 86 in FIG. 4. Reducing the height of teeth portion 74 substantially reduces the lever arm aspect of teeth portion 74, and thereby substantially reduces the effect of any tensile forces resulting from tangential forces 62 (FIG. 1) applied to teeth portions 74 during up cut and plunge cut.

In the conventional method of nose sprocket assembly construction, oversize gullet formations result in a wedge-like engagement of the sprocket 80. More particularly, a conventional drive tang engages the gullet formation at two points 90, i.e., along the side of each adjacent tooth portion 84. As a result, radially inward directed forces, such as force vectors 56 in FIG. 1, are received in wedge like fashion and apply tensile forces to the sprocket 80 tending to splay outward the adjacent the teeth portion 84. Such wedge-like engagement and resulting tensile forces cause fatigue at the base of conventional gullet formation 88. Such fatigue can result in cracking as indicated at reference numeral 92 in FIG. 4.

In comparison, the nose sprocket assembly 16 according to the present invention receives the drive tang portion of the saw chain substantially along the entire semi-circular gullet formation 70 resulting in substantially compressive forces applied to the sprocket 47. Similarly, tangential forces, such as force vectors 62 illustrated in FIG. 1, result in tensile forces upon the conventional sprocket 80. In contrast, the close nesting of the drive tang portions 42 within the gullet formation 70 of the nose sprocket assembly 16 substantially reduces the effect of tangential force vectors by delivering such tangential force primarily as compressive forces.

It may, therefore, be appreciated that the nose sprocket assembly 16 of the present invention experiences far less tensile forces in operation. The compressive forces experienced by the nose sprocket assembly 16 of the present invention are better withstood and result in less fatigue. The nose sprocket assembly 16 is thereby more durable, especially in the harsh operating conditions of aggregate cutting operations.

Thus, an improved nose sprocket assembly for a chain saw has been shown and described. It will be appreciated that the present invention is not restricted to the particular embodiment or application that has been described and illustrated and that variations may be made therein without departing from the scope of the invention as found in the appended claims and equivalents thereof. While the present invention is particularly suitable for aggregate cutting, it may be appreciated that the improved nose sprocket of the present invention may be applied, for example, in other cutting applications. Furthermore, while the present invention has been shown and described with respect to a semi-circular drive tang portion, it will be understood that the present invention encompasses other drive tang and nose sprocket configurations wherein operational forces are desirably received substantially as compressive forces at the gullet formation of the nose sprocket.

We claim:

1. In a chain saw:

a guide bar having opposed guide edges and a nose sprocket;

a saw chain having center links and side links with coupling pins pivotally connecting the center links front and rear to pairs of side links;

said sprocket having sprocket teeth defining gullets therebetween, said guide edges of said guide bar having edge grooves, and tang portions provided on said center links of said saw chain extending below said side links and protruded into the edge grooves of the guide bar and into the gullets of the sprocket when the saw chain is entrained on said guide bar, and as entrained on said guide bar, said front and rear coupling pins defining a common linear path along said guide edges of said guide bar and a common curviling around said nose sprocket;

said sprocket teeth having adjoining root portions cooperatively configured to define a rounded bottom in said gullets;

said center link tang portions configured to nest between the sprocket teeth and further configured with a bottom tang portion mated for engagement with the rounded bottoms in said gullets with the saw chain entrained on the guide bar as defined above.

2. In a chain saw, a sprocket and saw chain combination comprising:

a chain having a drive tang of a given dimensional configuration;

a sprocket including teeth receiving gullet formations therebetween, the dimensional configuration of said gullet formations corresponding to that of said drive tang portions and having a given radius of curvature whereby said tang portions are received closely within said gullet formations across a semicircular region of said gullet formations, whereby said drive tang portions are closely received within said gullet formations for distributing operating forces imposed upon said gullet formations by said tang portions across a substantial portion of said gullet formations; and means mounting said sprocket for rotation in said combination.

3. In a chain saw, a sprocket and saw chain combination comprising:

a chain having a drive tang of a given dimensional configuration;

a sprocket including teeth receiving gullet formations therebetween, the dimensional configuration of said gullet formations corresponding to that of said drive tang portions whereby said drive tang portions are closely received within said gullet formations for distributing operating forces imposed upon said gullet formations by said tang portions across a substantial portion of said gullet formations;

each of said center links being pivotally attached to the adjacent side link pairs by a pair of coupling pins, the dimensional configuration of said tang portions being symmetric with respect to an axis bisecting the corresponding center link and coupling pins; and means mounting said sprocket for rotation in said combination.

4. In a chain saw having a guide bar carrying a saw chain, the saw chain including drive tangs slidably disposed within a peripheral guide bar groove, an improvement comprising:

a nose sprocket defining sprocket teeth and gullet formations between said teeth, the gullet formations being adapted in shape corresponding to the shape of said drive tang portions and the shape of said gullet formations and said tang portions further corresponding to a given radius of curvature whereby said tang portions are received closely within said gullet formations across a semicircular region of said gullet formations; and means for rotationally mounting said sprocket at a distal end of said guide bar and for transferring said operational forces from said gullet formations to said guide bar.

5. In a chain saw having a guide bar carrying a saw chain, the saw chain including drive tang positions slidably disposed within a peripheral guide bar groove, an improvement comprising:

a nose sprocket defining sprocket teeth and gullet formations between said teeth, the gullet formations being adapted in shape corresponding to the shape of said drive tang portions;

means for rotationally mounting said sprocket at a distal end of said guide bar and for transferring said operational forces from said gullet formations to said guide bar; and said chain comprising side link pairs pivotally coupled to center links carrying said tang portions, each of said center links being pivotally attached to the adjacent side link pairs by a pair of coupling pins, the shape of said tang portions being symmetric with respect to an axis bisecting the corresponding center link and coupling pins.

6. A chain saw comprising:

a guide bar including a peripheral groove;

a chain adapted for entrainment about said guide bar and including center links interposed between side link pairs, the center link pairs and side links being pivotally coupled with each center link carrying a pair of coupling pins, the center links including tang portions slidably disposed within said groove and dimensioned symmetrically about an axis bisecting the distance between corresponding coupling pins thereof;

a nose sprocket rotatably mounted at a distal end of said guide bar and defining gullet formations for receiving said tang portions, said gullet formations corresponding in dimension and symmetry to that of said tang portions whereby operational forces exerted upon said gullet formations by said tang formations are distributed across a substantial portion of said gullet formations.

7. A chain saw according to claim 6 wherein said symmetry about said bisecting axis corresponds to a given radius of curvature whereby said tang portions are received closely within said gullet formations across a semicircular region of said gullet formations.

8. A chain saw according to claim 6 wherein said symmetry about said bisecting axis is such to apply substantially compressive force from said drive tang portions to said gullet formations in response to operational forces imposed upon said sprocket by said chain.

9. A chain saw according to claim 6 wherein said chain is an aggregate cutting saw chain.

* * * * *

UNITED STATES PATENT AND TRADEMARK OFFICE

CERTIFICATE OF CORRECTION

PATENT NO. : 5,136,783

DATED : August 11, 1992

INVENTOR(S) : Don A. Bell

It is certified that error appears in the above-indentified patent and that said Letters Patent is hereby corrected as shown below:

Column 5, line 63 should read --and a common curvilinear path around said nose sprocet;--.

Signed and Sealed this

Fifteenth Day of March, 1994

Attest:

Bruce Lehman

BRUCE LEHMAN

*Attesting Officer*

*Commissioner of Patents and Trademarks*

US005136783C1

(12) EX PARTE REEXAMINATION CERTIFICATE (7552nd)

United States Patent

Bell et al.

(10) Number: US 5,136,783 C1

(45) Certificate Issued: Jun. 8, 2010

(54) CHAIN SAW SPROCKET

(75) Inventors: Don A. Bell, Portland, OR (US); Encho Kuzarov, Milwaukie, OR (US)

(73) Assignee: General Electric Capital Corporation, Atlanta, GA (US)

Reexamination Request:
No. 90/008,989, Jan. 14, 2008

Reexamination Certificate for:

| | |
|---|---|
| Patent No.: | **5,136,783** |
| Issued: | **Aug. 11, 1992** |
| Appl. No.: | **07/704,466** |
| Filed: | **May 23, 1991** |

Certificate of Correction issued Mar. 15, 1994.

(51) Int. Cl.
*B23D 57/02* (2006.01)

(52) U.S. Cl. ............................................ 30/384; 125/21

(58) Field of Classification Search ......................... None
See application file for complete search history.

(56) References Cited

U.S. PATENT DOCUMENTS

| | | | |
|---|---|---|---|
| 1,392,503 | A | 10/1921 | Jackson |
| 2,060,547 | A | 11/1936 | Arsneau |
| 3,263,715 | A | 8/1966 | Dobbertin |
| 3,279,508 | A | 10/1966 | Ehlen et al. |
| 4,021,913 | A | 5/1977 | Arff |
| 4,492,030 | A | 1/1985 | Beerens |
| 4,593,591 | A | 6/1986 | Beerens |
| 4,747,214 | A | 5/1988 | Fischer et al. |
| 4,754,549 | A | 7/1988 | Fischer et al. |
| 4,756,221 | A | 7/1988 | Nitschmann |
| 4,796,360 | A | 1/1989 | Fischer et al. |
| 4,981,129 | A | 1/1991 | Osterman et al. |
| 5,048,389 | A | 9/1991 | Carlton |

*Primary Examiner*—Jeffrey L. Gellner

(57) ABSTRACT

A chain saw bar nose has a rotatable sprocket. The sprocket assembly is adapted to conform in shape to the drive tang portions of the saw chain whereby the nose sprocket may receive operational forces imposed by the saw chain substantially as compressive forces as oppposed to tensile forces. As a result, the nose sprocket assembly better withstands the harsh operating conditions imposed by cutting applications.

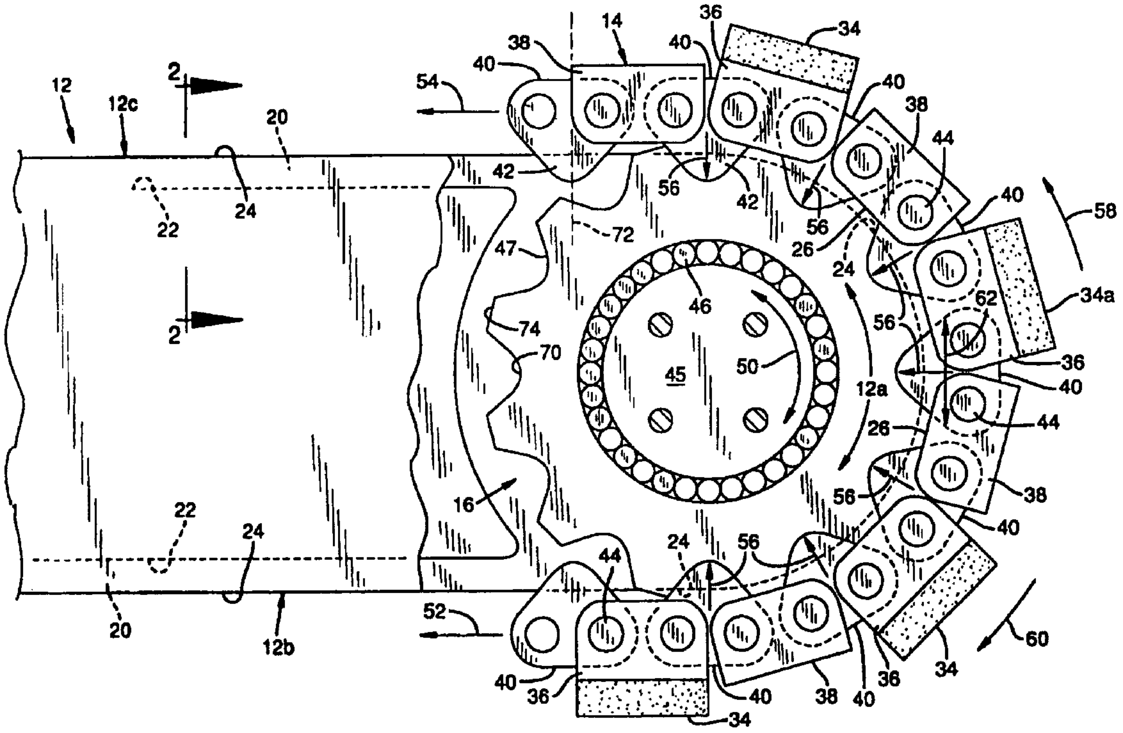

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 is determined to be patentable as amended.

Claims 2-9 were not reexamined.

1. In a chain saw:

a guide bar having opposed guide edges and a nose sprocket;

a saw chain having center links and side links with *symmetric* coupling pins pivotally connecting the center links front and rear to pairs of side links;

said sprocket having *an inner race and an outer race adapted to rotate around the inner race via a bearing interface, the outer race including an inner bore and* sprocket teeth defining gullets there between, *edge grooves disposed between* said guide edges of said guide bar [having edge grooves], and tang portions provided on said center links of said saw chain extending below said side links and protruded into the edges grooves of the guide bar and into the gullets of the sprocket when the saw chain is entrained on said guide bar, and as entrained on said guide bar *and during a cutting operation*, said front and rear coupling pins defining a common linear path along said guide edges of said guide bar and a common curvilinear path around said nose sprocket;

said sprocket teeth having adjoining root portions cooperatively configured to define a rounded bottom in said gullets;

said center link tang portions configured to nest between the sprocket teeth and further configured with a bottom tang portion mated for engagement with the rounded bottoms in said gullets with the saw chain entrained on the guide bar as defined above*;*

*wherein during the cutting operation the tangs contact the bottom of the gullets such that at least a portion of operational forces encountered are transferred to the rounded bottoms of the outer race gullets as a compressive force such that the operational forces are better distributed across the gullet.*

* * * * *